United States Patent [19]

Lathrop

[11] Patent Number: 5,724,596
[45] Date of Patent: Mar. 3, 1998

[54] ALGORITHMIC CHARACTER-SPACE ADJUSTMENT COMPUTED FROM CHARACTER-SEQUENCE-BASED CONSTANTS AND FONT SIZE

[76] Inventor: Stephen P. Lathrop, 14 Western Ave., Hull, Mass. 02045

[21] Appl. No.: 935,512

[22] Filed: Aug. 25, 1992

[51] Int. Cl.⁶ ................................................ G06F 17/21
[52] U.S. Cl. ............................................................ 395/781
[58] Field of Search ............................. 395/150, 151, 395/781, 167; 400/303, 306, 304, 1, 3, 9, 76, 61; 354/8

[56] References Cited

U.S. PATENT DOCUMENTS

| | | | |
|---|---|---|---|
| 3,552,284 | 1/1971 | Noble | 396/558 |
| 3,712,443 | 1/1973 | Mathews | 400/304 |
| 3,785,258 | 1/1974 | Aron et al. | 396/553 |
| 4,027,313 | 5/1977 | Klepper et al. | 396/559 |
| 4,291,381 | 9/1981 | Siebeck | 395/781 |
| 4,379,282 | 4/1983 | Bailey | 382/178 |
| 4,558,965 | 12/1985 | Ueda et al. | 400/144.2 |
| 4,573,812 | 3/1986 | Kondo | 400/303 X |
| 4,591,999 | 5/1986 | Logan | 395/781 |
| 5,150,460 | 9/1992 | Onodera et al. | 395/805 |
| 5,167,016 | 11/1992 | Bagley et al. | 395/793 |
| 5,197,121 | 3/1993 | Miyoshi et al. | 395/792 |
| 5,263,132 | 11/1993 | Parker et al. | 395/805 |

FOREIGN PATENT DOCUMENTS

| | | | |
|---|---|---|---|
| 1271275 | 10/1989 | Japan | B41J 19/32 |
| 691738 | 5/1953 | United Kingdom | 400/303 |
| 1323677 | 7/1973 | United Kingdom | B41J 5/00 |
| 1442544 | 7/1976 | United Kingdom | G06F 15/20 |
| 2016189 | 9/1979 | United Kingdom | . |

*Primary Examiner*—Anton W. Fetting
*Attorney, Agent, or Firm*—Cesari and McKenna, LLP

[57] ABSTRACT

A computer-driven printing system automatically adjusts inter-character spacing to account for the different visual effects that font scaling has on different ordered character pairs. The adjustment $A(S, X_j, X_k)$ for a given size s and character pair $(X_j, X_k)$ is computed from the formula:

$$A(s, X_j, X_k) = C_1(X_j, X_k) + C_2(X_j, X_k) s^{-\frac{1}{2}},$$

where $C_1$ and $C_2$ are constants with respect to s but are not in general independent of $(X_j, X_k)$. The constants $C_1$ and $C_2$ are determined by a procedure that is equivalent to finding A manually at more than one size s and solving the resulting equations simultaneously.

16 Claims, 1 Drawing Sheet

ALGORITHMIC CHARACTER-SPACE ADJUSTMENT COMPUTED FROM CHARACTER-SEQUENCE-BASED CONSTANTS AND FONT SIZE

BACKGROUND OF THE INVENTION

The present invention is directed to typography and in particular to providing inter-character spacing.

Typography is the art of rendering copy in type in a way that conveys the intended message most effectively. The typographer's goal typically is (1) that the reader receive the intended message without being distracted any more than necessary by the type itself but (2) that the overall visual effect of the type reflect favorably on the conveyed message.

Much of this result is achieved by choosing a type font or fonts well suited to the message and by choosing appropriate sizes for various parts of the message. Arrangement of the various parts of the message on a page also enters into achieving this result.

Once these elements have been established, the spacing of individual letters and words becomes important. The simplest spacing is that which characterizes constant-pitch type. Successive characters can be thought of as being contained in respective contiguous rectangular boxes, each of which typically contains not only the character itself but also side bearing, i.e., the spaces provided by the font designer between the character and the box's border that keep successive characters visually distinct. For constant-pitch type, the boxes are all of equal width regardless of the character's shape. Such type differs from proportionally spaced type, which uses different-width boxes for different characters and is ordinarily considered to produce a more pleasing result.

But even proportional spacing does not yield quality as high as that required by, for instance, many wide-circulation magazine advertisements. The reason for this stems from the fact that the appearance and readability of type depends greatly on the "negative" spaces formed between pairs of successive characters. Clearly, the shape of this negative space depends on the shapes of both characters and the amount of space that results from their relative positions. The relative positioning that results in a pleasing appearance on the right side of a given character varies in accordance with the left-side shape of the next character. Accordingly, a high-quality type job requires that character positions be adjusted from the default spacings that result when successive boxes are contiguous; i.e., successive characters' boxes must overlap for some character pairs and be spaced apart for others.

For this reason, type fonts and typography programs employed for high-quality work include provisions for such "kerning." In many cases, the font supplier provides a set of kerning values with the font: for each of a number of two-character sequences ("kerning pairs"), the font supplier provides an adjustment from the spacing that results when the characters' rectangles are contiguous. (Kerning data typically are not provided for all theoretically possible sequences, since some of them, such as the sequence qq, or a lower-case letter followed immediately by a capital letter, rarely occur.)

Even if kerning data are not generated for all of the theoretically possible kerning pairs, the effort required to determine the proper values is significant. Data for well over a thousand kerning pairs, and possibly for over two thousand such pairs, may be desired and commonly used for a given font. To develop these kerning data, a trial spacing must be printed (or otherwise displayed) for each kerning pair, at the most commonly used text size, for example, and reviewed by a skilled human operator, who then returns to his computer to enter an improved trial spacing and have type displayed with the new spacing. This operation must be performed iteratively until acceptable kerning values are achieved for the individual pair. The values for different pairs are then typically compared, and further adjustments may be made to "harmonize" different pairs' spacings, i.e., to eliminate notable disparities between the visual impression given by the spacings of different character pairs that have similar conjunctions of shapes. The harmonization step, for instance, would usually insure that the spacings for the (o, o) and (o, e) pairs are the same.

Despite the considerable effort that this entails, such a task is often undertaken for a font's normal text size because a high volume of copy at that size will be used. Once the kerning data have been generated, software can automatically insert the appropriate spacing adjustment as the copy is created, ordinarily without further attention from a human operator. This not only reduces human labor greatly but also acts as a quality-control mechanism, reducing the inconsistencies that manual kerning from the keyboard might introduce.

Despite the use of stored kerning data to make kerning adjustments automatically, however, manual kerning remains a significant labor cost and quality-control problem. The reason for this is that properly kerned text appears not to remain so when it is scaled up to display or headline sizes from the font's normal text size, at which the kerning data are frequently determined. If the inter-character spaces are simply scaled along with the characters, the resultant type appears to be objectionably "loose" in many situations, even though the spacing on a relative basis is exactly the same as the spacing that appears pleasing in type of the size at which the font was originally kerned. Similarly, scaling down tends to result in type that is too tight. In both cases, the greater the difference between a type size and the size at which the kerning values were established, the more objectionable the spacing will be.

An automatically implementable solution to this problem is "tracking." The font supplier, or the typographer himself, will specify tracking values for selected point sizes of a given font, and tracking values for other sizes are obtained by interpolation. From the spacing that results simply from scaling up properly kerned text-size type, then, computer software automatically subtracts from each inter-character space the tracking adjustment for the point size used. (For small type, the tracking value may be negative, so the "subtraction" actually adds space.) This reduces the effort required to achieve the desired effect, but the result for many kerning pairs still is not satisfactory to most skilled typographers and many of their customers.

There are two reasons for this. One is simply that small relative spacing differences that are not detectable in text-sized copy become apparent at larger sizes. The other is that the visual effects of scaling differ for different kerning pairs. Even with tracking, therefore, the scaled type ends up lacking harmony: two character pairs whose relative spacings give the type a uniformly spaced appearance at one type size yield an uneven appearance in the scaled copy if a tracking adjustment is performed without re-kerning.

As a result, it has largely been accepted in the industry that a significant amount of manual kerning must be done for any high-quality job that employs type whose size differs significantly from that at which the font was designed and kerned.

SUMMARY OF THE INVENTION

I have developed a process that greatly expedites the assigning of kerning values to a font and largely eliminates the manual kerning needed when the font is scaled. Instead of obtaining just a common tracking value by interpolation, I effectively interpolate to obtain spacing values whose variation with size depends on the character pair; i.e., the difference between the spacing adjustments obtained by interpolation for two sizes is not the same for all character pairs.

In principle, this means that the user or some other expert determines proper adjustment values for each character pair at a plurality of sizes (typically two) and supplies them to a computer-based typesetting apparatus. When the apparatus then displays a given character pair at some other size, it employs a spacing that has been adjusted by a value that the apparatus in effect finds at that size on an interpolation curve that passes through the plurality of values that the user has provided for that pair. (Clearly, there is no reason why the other size actually has to be between the two sizes for which adjustment values were determined, so the process is sometimes extrapolation rather than interpolation. For the sake of convenience, however, I will use the term interpolation for both cases.)

The interpolation curves that the apparatus uses are preferably of the general form:

$$A(s, \chi_j, \chi_k) = \sum_{n=1}^{K} C_n(\chi_j, \chi_k) s^{r_n} \quad (1)$$

where $A(s, X_j, X_k)$ is the adjustment value in relative units at size s for the character pair $(X_j, X_k)$. $C_n(X_j, X_k)$ is a non-zero constant with respect to s, K is an integer greater than 1, $r_n \neq 0$ for at least one value of n, and, since the curves are based on determined values that differ for different character pairs, the variations in $A(s, X_j, X_k)$ with s are not the same for all values of $(X_j, X_k)$. In this way, the printing apparatus automatically provides adjustments whose variations with character size differs in accordance with the identities of the pairs being spaced. The resultant spacings tend to be more nearly those that would result from high-quality manual kerning at the new size, although the degree to which this result is achieved depends on the particular curve shape chosen for the interpolation. In this connection, I prefer that the interpolation curve be perceptibly nonlinear. I have found, for instance, that it is best to use curves in which at least one of the $r_n$'s is negative. Curves of the form $$A(s, X_j, X_k) = C_1(X_j, X_k) + C_2(X_j, X_k)s^{-\frac{1}{2}} \quad (2)$$

provide particularly beneficial results.

With this approach, one can begin with "reference" kerning values established for one size of the font and, with a small amount of additional information concerning one or more other sizes, automatically determine for all sizes spacings that retain at new type sizes the harmony achieved at one size by manual kerning.

This approach has additional advantages. Because it enables kerning values determined for one size to be scaled reliably to another size without a loss of harmony, it permits the kerning to be performed at high point sizes even though most actual use of the type will take place at lower sizes. This eliminates the resolution-caused errors that result from performing the reference kerning at low point sizes. Moreover, the initial (pair-by-pair) kerning can therefore be performed completely on a computer screen, since the screen's low resolution, which prevents it from being used for smaller-size kerning, is not a significant limitation for larger sizes. This leaves only the harmonization of similar pairs to be done by copy proofing. Conversely, type to be used at a size either larger or smaller than that at which it can conveniently be set—e.g., on a billboard—can be reliably set without actually having to project it to the size at which it is to be displayed. The time required by the kerning process can be reduced to a fraction of that required by conventional methods.

BRIEF DESCRIPTION OF THE DRAWINGS

These and further features and advantages of the present invention are described below by reference to the accompanying drawings, in which.

DETAILED DESCRIPTION OF AN ILLUSTRATIVE EMBODIMENT

Figure 2:
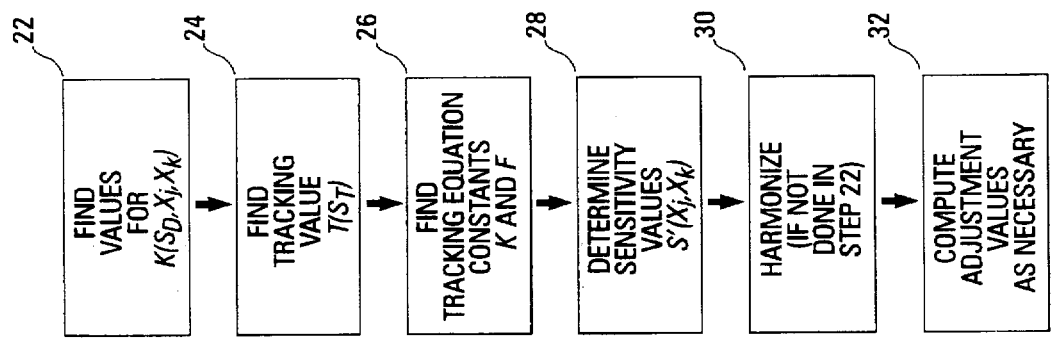
FIG. 2 is a flow chart that illustrates one embodiment of the present invention.
Figure 1:
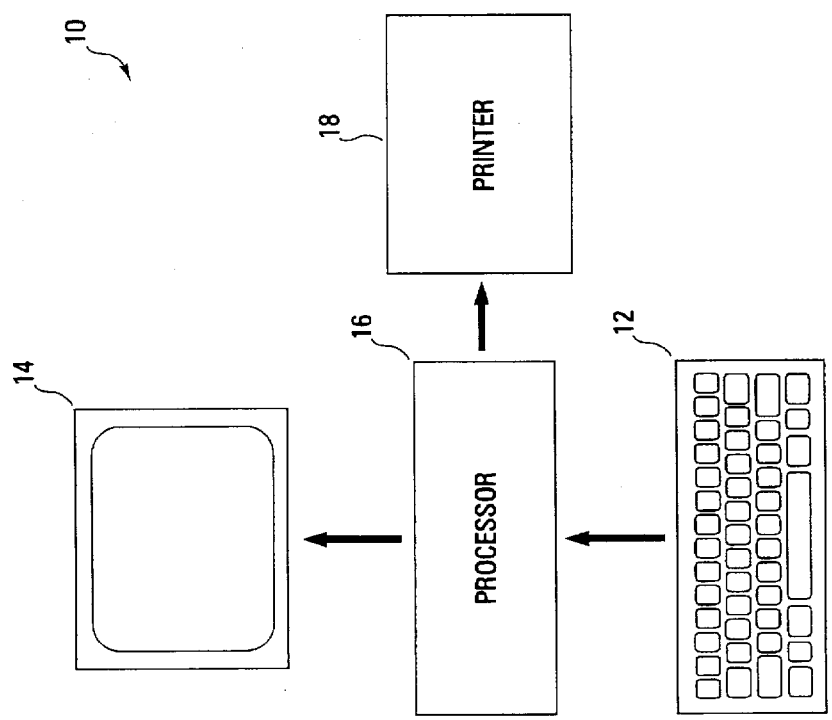
FIG. 1 is a block diagram of a computer-based typographic system in which the teachings of the present invention may be employed.

In a typical typographic application, the user is provided with a computer system 10 including a keyboard 12, a computer screen 14, a processor 16, and a printer 18. With application software of the kind ordinarily available for typographic applications, the user can enter into the computer's storage areas kerning and tracking values to be used with the given font. He then types in the copy, possibly interrupting the copy from time to time to enter commands that change the size of the characters in which the subsequent copy will be printed.

After the copy has been entered, the user directs the computer to operate the printer so as to render the copy in accordance with the commands, and the computer loads the copy into the printer, automatically inserting between each pair of characters the spacing specified by the kerning and tracking values previously entered. That is, once those values have been stored in the computer's memory for each font, the user need not again concern himself with them.

In conventional practice, this does not mean that no adjustment effort remains. Even after automatic tracking and kerning, only type at or near the size at which the kerning values were originally determined will ordinarily have the best possible appearance. Conventionally, therefore, kerning values will ordinarily have been determined for the (higher-volume) text size, as opposed to the (lower-volume) display, or headline, sizes. Type of the larger size will often have objectionable spacings despite the conventional automatic adjustments, so manual kerning is frequently practiced for the large type.

According to the illustrated embodiment of the present invention, however, the spacing employed for type scaled from sizes at which the reference kerning values were determined is instead computed in accordance with the relationship set forth in equation (2). By employing this approach, I have found that I can almost entirely eliminate the need for the manual kerning that many users of previous approaches require.

Although in principle the illustrated embodiment of my method uses a relationship of the type exemplified by equation (2), my practice in implementing that relationship has thus far been to consider the adjustment A to be the sum of a tracking component T and a kerning component K. This makes the process compatible with the separate tracking and kerning approaches used by popular typography software.

FIG. 2 is a flow chart that depicts this embodiment of my invention, although it will become apparent as the description proceeds that the approach can be employed in ways that differ significantly from that which FIG. 2 represents.

The procedure begins with the step represented by block 22 of FIG. 2. In that step, all two-character sequences of interest are kerned for a given point size. This step is the same in principle as conventional kerning operations. Because of the reliability with which my invention determines proper kerning values at one size from those at another, however, the reference kerning values can be established at a point size much larger than the text size. The kerning can therefore be done much more quickly; since it can be done at a size large enough essentially to eliminate the resolution problems encountered when computer screens display smaller-sized type, it can be done completely on a computer screen, except possibly for a final harmonizing step, which requires the display of multiple pairs simultaneously. For the purposes of explanation, therefore, we will refer to step 22 as being performed at a large, "display" size, although such a large size is not necessary in order to practice the broader aspects of the invention.

The result of this step is a set of adjustment values (typically expressed in "relative units" of, e.g., 1/200 of the nominal point size in question), one value for each kerning pair. As was indicated above, the adjustment is considered in this embodiment of the invention to be the sum of a (pair-dependent) kerning component and a (pair-independent) tracking component. At this point in the process the division of the adjustment between components is largely arbitrary, however, so I normally set the display-size tracking value to zero.

The next step, represented in FIG. 2 by block 24, is to obtain a formula for determining tracking values T for all other type sizes s. I first display type at different size—typically, the much-smaller text size—using the adjustment values determined by reference to the display type. The resultant type will be too "tight"; adjustment values determined for the much larger size will not result in spacing adequate for the smaller-sized type.

To determine how much tracking space needs to be added, I inspect the display of a representative kerning pair. I find it convenient for this purpose to use a pair, such as the sequence (o, m), that I know from experience is of the kind most sensitive to scale changes: it is of the kind whose optimum spacing at a smaller type size differs most from that determined for it at a larger type size.

By adjusting this pair's spacing, I assign a tracking value $T(s_t)$, i.e., the tracking value T for the text-type size $s_T$. Specifically, I find the amount of additional space that will properly space the (o, m) sequence. If, contrary to my usual practice, I have assigned a non-zero value $T_D$ to the display-size tracking value $T(s_D)$, then the tracking value $T(s_T)$ for the text size $s_T$ is the sum of $T_D$ and the value by which the space between the o and the m had to be adjusted. Otherwise, $T(s_T)$ is simply that value alone. Let us assume that the value of $T(s_T)$ thereby determined is $T_T$.

I then assume that the tracking value is itself a function in the form of a constant plus a quantity proportional to the negative one-half power of the size, and I consider it convenient to write that relationship in the following manner:

$$T(s) = R\sqrt{\frac{s_T}{s}} - F, \tag{3}$$

where R and F are constants. I solve for these constants by evaluating the formula at the two sizes $s_T$ and $s_D$, at which I know that T(s) takes on values $T_T$ and $T_D$, respectively, and I thereby obtain the following values for the constants R and F:

$$R = \frac{T_T - T_D}{1 - \sqrt{\frac{s_T}{s_D}}} \tag{4}$$

$$F = \frac{T_T - T_D\sqrt{\frac{s_D}{s_T}}}{\sqrt{\frac{s_D}{s_T}} - 1}. \tag{5}$$

Block 26 represents this step, which, through the relationship expressed by equation (2), thereby establishes a tracking value for every size of that font.

The total adjustment for any given kerning pair, however, includes not only the tracking adjustment, which is a function of size only, but also a kerning adjustment, which is specific to the particular kerning pair. This kerning value for each kerning pair is a respective function of point size that, in the illustrated embodiment of the invention, is assumed to take the form of a constant plus a quantity proportional to the negative one-half power of size. That is, the kerning value K for each given size and pair is given by an equation of the following form:

$$K[s, X_j, X_k] = G[X_j, X_k] + H[X_j, X_k]s^{-\frac{1}{2}}, \tag{6}$$

where G and H, as the equation indicates, are constants with respect to s but depend on the identity of the particular kerning pair.

To find these constants, of course, requires the equation to be evaluated at two points. Having begun by kerning the font at the display size, we have already identified one value of K for each kerning pair. In principle, finding the other value requires kerning the font again at a different size. Indeed, one can kern again in the conventional way without departing from the present invention. However, I prefer to expedite the process by employing a method that emphasizes the fact that the optimum spacings for different pairs have different sensitivities to scaling and that those sensitivities are determined by the shapes of the constituent characters' outlines that bound the space between them.

To understand this approach, it is beneficial first to recall that the tracking curve was so chosen as to result in the proper spacing for the pair (o, m) at the text size when the only adjustments are that tracking value and the "reference" kerning value, i.e., in this case, the kerning value for that pair determined at the display size. By determining the tracking curve with reference to a kerning pair whose optimum spacing a typographer will know from experience is most sensitive to scaling, I have obtained a tracking curve that, for most kerning pairs, overcompensates for the effects of scaling. This is not a necessary feature of the present invention; I could, for instance, have chosen a pair whose sensitivity is in the middle of the range. However, I prefer this approach because it enables me to assign to each kerning pair what I call a "sensitivity factor" S' that has values between zero and one and can be used in a manner that I will now describe.

I express the kerning value for a given kerning pair at a given size as the reference kerning value for that pair minus a fraction to be subtracted from the tracking value because of the comparative lack of sensitivity of the particular pair. For the (o, m) pair whose optimum spacing is most sensitive to scaling, the sensitivity S' is unity, so S=1−S' is zero and no fraction needs to be subtracted from the tracking adjustment. The kerning value for the (o, m) pair at any size is the same as the reference kerning value: I have so chosen the tracking curve that the kerning value for that pair is a constant.

For less-sensitive pairs, on the other hand, I so adjust the kerning value as to remove a non-zero fraction S=1−S' of the tracking effect:

$$K(s,X_j,X_k)=K(s_D,X_j,X_k)-S(X_j,X_k)\cdot[T(s)-T_D]. \tag{7}$$

By recognizing that T(s) has the form given by equation (3), it can be appreciated that equation (7) actually is of the form set forth by equation (6).

This transforms the problem of assigning values to the constants of equation (6) into one of determining sensitivity values. Such a transformation enables us to think in terms of sensitivity, but it does not immediately reduce labor: we must still find a sensitivity value for each kerning pair. In principle, this can be done simply by kerning all pairs at a second size, and that is in fact one approach to practicing the invention. However, a little comparison of the various character shapes enables one to classify them in accordance with the shapes of their left and right sides, and thus in accordance with their sensitivities. The normal sensitivity-value determination can thus be restricted to only one representative pair of each class.

Table I is a partial shape chart that I have employed for the Century Oldstyle font, for instance. The first column is a partial list of the font's characters, the second is a list of right-side shape classifications, and the third is a list of left-side shape classifications. The shape codes are mnemonics; e.g., rcd means "receding," srf means "serif," duu means "shaped like a d or a u," and aaa "means shaped like an a." Different fonts result in different classifications, which a typographer or other skilled person will be required to assign, but many fonts will have shape classifications largely or completely similar to those of many others.

Combinations of these left-side and right-side shape classes yields kerning-pair classes. For instance, all kerning pairs like the pair (b, j, in which an "rnd" right-side shape is followed by an "srf" left-side shape, fall into the same class, which in this case contains twenty-four kerning pairs. By determining the sensitivity factor S'(b, j, therefore, I also determine S'(X_j, X_k) for all kerning pairs (X_j, X_k) in the same class. Indeed, such a determination may in practice fix the sensitivity factor for a "superclass" of classes whose member pairs should, as a quality-control matter, be similarly spaced. For example, the pairs (o, l) and (l, o) should be similarly spaced in Roman fonts, so their respective classes, namely, the rnd-tll and tll-rnd classes, will be members of the same superclass.

TABLE I

| Ch | RS | LS |
|---|---|---|
| a | aaa | aaa |
| b | rnd | sns |
| c | ccc | rnd |
| d | duu | rnd |
| e | rnd | rnd |
| f | fff | fff |
| g | ggg | ggg |

TABLE I-continued

| Ch | RS | LS |
|---|---|---|
| h | rcd | tll |
| i | tll | srf |
| j | sns | srf |
| k | kkk | tll |
| l | tll | tll |
| m | rcd | srf |
| n | rcd | srf |
| o | rnd | rnd |
| p | rnd | srf |
| q | sns | rnd |
| r | rrr | srf |
| s | sss | sss |
| t | ttt | ttt |
| u | duu | uuu |
| v | rch | rch |
| w | rch | rch |
| x | exx | exx |
| y | rch | rch |
| z | zzz | zzz |
| ' | ltp | ltp |
| , | rtp | rtp |
| - | mlp | mlp |
| – | mlp | mlp |
| — | mlp | mlp |
| . | per | per |
| ; | com | com |
| ( | lpa | xxx |
| ) | rpa | rpa |
| ! | xxx | str |
| ? | xxx | que |
| ; | xxx | str |
| : | xxx | str |

In a step represented by block 28, I then choose a representative member of each kerning-pair class and determine its sensitivity factor. This involves displaying (or printing) each class-representing kerning pair $(X_j, X_k)$ at a font size $s_M$ that differs from the (in this case, display) size at which the reference kerning values were determined. For this purpose, I consider it desirable to employ an intermediate size, such as one for which the now-established tracking curve yields a value of 10 relative units. The resultant size is thereby significantly different from that at which the reference kerning values were determined, but it is still large enough that the spacing change of only a small number of relative units is apparent to the eye.

Each representative pair is initially displayed or printed with its spacing adjusted in accordance with the now-established tracking value $T(s_M)$ and the reference kerning value $K(s_D, X_j, X_k)$, which was determined for the display size $s_D$. This does not in general result in the proper spacing, so, by entering keyboard commands, I manually adjust the pair by the number $\Delta$ of units required to kern it properly. Because of my choice of one of the most-sensitive pairs as the one upon which I base my determination of the tracking curve, this further adjustment $\Delta$ is an indication of the lack of sensitivity of the particular pair—and of those in the same superclass—to scaling: in these circumstances, this adjustment is a reduction from the tracking adjustment based on the most-sensitive pairs.

More specifically, I can determine the insensitivity S from the additional adjustment $\Delta$ in accordance with:

$$S(\chi_j,\chi_k)=\frac{\Delta(\chi_j,\chi_k)}{T(s_M)-T_D}. \tag{8}$$

With this information, it is possible to compute the complete adjustments for all kerning pairs of all sizes of the font in question by adding the resultant T and K outputs of equations (3) and (7). If a properly kerned set of spacings has been determined for the display size, the resultant adjustment will result in proper spacings at other sizes, too.

In practice, however, I do not fully perform step 22 before proceeding to the other steps. I perform individual kerning adjustments in step 22 to obtain preliminary reference kerning values $K(s_D, X_j, X_k)$, but I do not perform the harmonization step until after I have obtained the (similarly preliminary) sensitivity values and thus can compute spacings in accordance with equations (3) and (7). This enables me to perform harmonization with text-size type, which I have thus far found more convenient for that purpose. With the spacings thus computed for text-sized type, I perform the harmonization, represented by block 30, by inspecting a sample of the resultant text type, making any revisions by changing reference kerning values $K(s_D, X_j, X_k)$ (in the case of changes to individual pairs in respective classes) or sensitivities $S(X_j, X_k)$ (in the case of changes to whole classes). With the thus-changed values, equations (3) and (7) can then be used for printing, as block 32 indicates.

Specifically, when a document is being assembled, the user specifies the font and enters the copy, presumably after having determined or obtained kerning values for a reference size and having determined or obtained the constants mentioned above. The resultant information is accordingly stored in some form in the computer's memory. Associated with each font, for instance, may be a single set of kerning values, a pair of tracking-value constants, and a sensitivity value for each kerning pair. One alternative is not to store a sensitivity constant for each pair but instead to store a sensitivity value only for each class or superclass and a class or superclass designation for each pair. Another alternative is simply to store $C_1$ and $C_2$ values in accordance with equations (12) and (13) below for each character pair.

In any event, when the time comes for the computer to pass spacing values to the printer, it employs values that are appropriate for the particular font size and kerning pair involved; it does not simply use a reference kerning value and possibly a rough tracking value. But it can provide such pair-individualized spacing without the need for a separate kerning table for each combination of font and size. Instead, it refers to the reference kerning value and the necessary constants and computes the total adjustment indicated by equations (3) and (7) above. That is, it computes the adjustments in accordance with (in this case, non-linear) interpolation curves whose variations with size are not in general the same for different pairs. I have found that this approach not only eliminates almost all manual kerning of the assembled copy but can also reduce quality-control problems and data-handling requirements.

Although the discussion here concentrates on spacings between letters, those skilled in the art will recognize that the method is equally applicable to inter-word spacing. Typographic-software suppliers ordinarily provide a default inter-word spacing, to which the method discussed here can be applied to make size-based adjustments. That is, the adjustment values for inter-word spaces at new sizes can be obtained by interpolation curves determined by values that the user specifies for (typically two) other sizes, and the variations with size in the word-spacing adjustments will thus differ from each other in accordance with the types of characters that bound the space. For instance, one curve might be used for inter-word spaces bounded by lower-case letters, a second for those bounded by capitals, and a third for those bounded by a lower-case and a capital. Of course, one can further differentiate in accordance with the identities of, e.g., the specific bounding capital and/or lower-case letters, as is done for inter-character spaces.

The method as described so far yields excellent results so long as the copy consists only of kerning pairs for which kerning values have been determined. If 100% kerning is not employed, however, one extra step is desirable. In this step, the values T and K determined above are replaced with new tracking and kerning values T' and K' assigned in accordance with:

$$T'(s) = 0 \tag{9}$$

and $$K'(s, X_j, X_k) = K(s, X_j, X_k) + T(s). \tag{10}$$

This results in the same total adjustment for all kerning pairs to which kerning values have been assigned. For those with no kerning values, however, it results in the default spacing, which is usually preferable to tracking without kerning.

Although I prefer to employ the specific approach of FIG. 2 because it employs parameters that are meaningful to me, the basic principle on which this approach is based can be employed in a number of different ways.

In the first place, it will be recognized that the total adjustment is, as was indicated above, of the following form:

$$A(s, X_j, X_k) = C_1(X_j, X_k) + C_2(X_j, X_k) s^{-\frac{1}{2}}, \tag{11}$$

where A is the total of the tracking and kerning adjustments, $$C_1(\chi_j, \chi_k) = K(s_D, \chi_j, \chi_k) - (F + S(\chi_j, \chi_k)) \cdot (F + T_D), \tag{12}$$

and $$C_2(\chi_j, \chi_k) = R \sqrt{s_T} [1 - S(\chi_j, \chi_k)]. \tag{13}$$

It is thus clear that it would be possible to practice the invention by simply employing this equation form for the total adjustment without separately determining kerning and tracking adjustments.

Specifically, an adjustment value could be determined for each kerning pair at each of two sizes. This could perhaps be expedited by determining the adjustment values at one or the other (or both) of the sizes by classes rather than by individual pairs. The resultant two kerning values for each character pair $(X_j, X_k)$ could be used to solve equation (10) for the two constants $C_1(X_j, X_k)$ and $C_2(X_j, X_k)$ associated with each kerning pair.

Secondly, although the results that I have obtained by employing an adjustment function of the form given by equation (11) indicate that this form is beneficial, good results can be obtained by using other interpolation formulas of the form:

$$A(s, \chi_j, \chi_k) = \sum_{n=1}^{K} C_n(\chi_j, \chi_k) s^{r_n}, \tag{14}$$

where the $C_n$'s are non-zero constants with respect to s, $r \neq 0$ for at least one value of n, K is an integer greater than 1, and the variation in $A(s, X_j, X_k)$ with s is not in general the same for all $(X_l, X_m)$'s. However, I believe that the best-quality results are obtained if the interpolation curve is perceptibly non-linear. (An adjustment-value difference of a single relative unit is perceptible by some standards in eighteen-point or larger type, but the difference must in most cases be at least two relative units in smaller type sizes to be perceptible. Thus, it is preferable for the values in the interpolation curve to differ from a given linear curve by at least two relative units at least at some point size below eighteen points and/or by at least one relative unit at least at some point size at or above eighteen points.) In particular, I prefer that at least one of the $r_n$'s be negative.

For instance, I have experimented with interpolation formulas of the form:

$$A[s,X_j,X_k]=C_1[s,X_j,X_k]+C_2[s,X_j,X_k]s^{-\frac{1}{2}}+C_3[s,X_j,X_k]s. \quad (15)$$

Whereas adjustment values must, in effect, be supplied at two sizes to employ equations (3) and (7)—and thus equation (11)—use of equation (15) requires that adjustment values for three sizes be supplied. The effort of providing this extra set of values may be justified in some circumstances in which the user wants particular effects. Also, there may be circumstances in which adjustment values at three point sizes are already known and it is desired to insure that the locus of adjustment values pass through all three points. Even in this case, though, one may prefer to apply the curve shapes of equation (11). That is, one could employ a composite of two curves of the equation (11) type, one of which would prevail in the interval between and below the bottom and middle point sizes at which such values are known and be defined by those values, the other of which would similarly be defined by the middle and top such sizes and prevail between and above them.

Although it is desirable for compatibility purposes that the adjustments be given in relative units, there is no reason in principle why absolute units can not be used instead, in which case the "negative" power of s would be transformed to a power less than unity; e.g., equation (11) would be converted to:

$$A[s,X_j,X_k]=C_1[X_j,X_k]s+C_2[X_j,X_k]s^{1/2}. \quad (16)$$

Although the invention has been described above in connection with a computer-driven printer, it will be clear that it can be employed for other computer-driven imaging systems, too, such as the CRT display device 14, film recorders for making slides, image setters for orthographic film or photosensitive paper, plate-making machines for printing, etc.

It is thus apparent that the present invention can be practiced in a wide range of embodiments and thus constitutes a significant advance in the art.

What is claimed is:

1. For displaying type characters, an apparatus comprising:

A) a computer for computing, for each of a plurality of character sequences $(X_j, X_k)$ of font size s, where $X_j$ and $X_k$ are respectively the first and second characters in a sequence, an adjustment value $A(s, X_j, X_k)$ in accordance with a formula that, in relative units, is essentially as follows:

$$A(s,\chi_j,\chi_k) = \sum_{n=1}^{K} C_n(\chi_j,\chi_k) s^{r_n},$$

where the $C_n$'s are non-zero constants with respect to s, $r_n \neq 0$ for at least one value of n, the values of $r_n$ differ for different values of n, K is an integer greater than 1, and the variation in $A(s, X_j, X_k)$ with respect to s is not the same for all $(X_j, X_k)$; and B) an imaging system, responsive to the adjustment values thus computed, for displaying the character sequences such that the characters are spaced apart by distances adjusted in accordance with those adjustment values.

2. An apparatus as defined in claim 1 wherein the adjustment $A(s, X_j, X_k)$ as a function of s differs perceptibly from a linear function of s for at least some values of $(X_j, X_k)$.

3. An apparatus as defined in claim 2 wherein $r_n < 0$ for at least one value of n.

4. An apparatus as defined in claim 3 wherein the formula is essentially of the form:

$$A(s, X_j, X_k)=C_1(X_j,X_k)+C_2(X_j,X_k)s^{-\frac{1}{2}}.$$

5. An apparatus for displaying type characters organized into words, the apparatus comprising:

A) a computer for computing, for each of a plurality of pairs of successive words that form inter-word spaces bounded by respective character sequences $(X_j, X_k)$ of font size s, where $X_j$ and $X_k$ are respectively the first and second characters in a sequence, an adjustment value $A'(s,X_j,X_k)$ in accordance with a formula that, in relative units, is essentially as follows $$A'(s,\chi_j,\chi_k) = \sum_{n=1}^{K} C'_n(\chi_j,\chi_k) s^{r_n},$$

where the $C'_n$'s are non-zero constants with respect to s, $r_n \neq 0$ for at least one value of n, the values of $r_n$ differ for different values of n, K is an integer greater than 1, and the variation in $A'(s,X_j,X_k)$ with s is not the same for all $(X_j,X_k)$; and B) an imaging system responsive to the adjustment values thus computed for displaying the word pairs such that the words are spaced apart by distances adjusted in accordance with those adjustment values.

6. An apparatus as defined in claim 5 wherein the adjustment $A'(s, X_j, X_k)$ as a function of s differs perceptibly from a linear function of s for at least some values of $(X_j, X_k)$.

7. An apparatus as defined in claim 6 wherein $r_n < 0$ for at least one value of n.

8. An apparatus as defined in claim 7 wherein the formula is essentially of the form:

$$A'(s, X_j, X_k)=C_1'(X_j, X_k)+C_2'(X_j, X_k)s^{-\frac{1}{2}}.$$

9. A method of displaying type characters comprising the steps of:

A) computing, for each of a plurality of character sequences $(X_j,X_k)$ of font size s, where $X_j$ and $X_k$ are respectively the first and second characters in a sequence, an adjustment value $A(s,X_j,X_k)$ in accordance with a formula that, in relative units, is essentially as follows $$A(s,\chi_j,\chi_k) = \sum_{n=1}^{K} C_n(\chi_j,\chi_k) s^{r_n},$$

where the $C_n$'s are non-zero constants with respect to s, $r_n \neq 0$ for at least one value of n, the values of $r_n$ differ for different values of n, K is an integer greater than 1, and the variation in $A(s,X_j,X_k)$ with s is not the same for all $(X_j,X_k)$; and B) displaying the character sequences such that the characters are spaced apart by distances adjusted in accordance with the adjustment values thus computed.

10. A method as defined in claim 9 wherein the adjustment $A(s, X_j, X_k)$ as a function of s differs perceptibly from a linear function of s for at least some values of $(X_j, X_k)$.

11. A method as defined in claim 10 wherein $r_n < 0$ for at least one value of n.

12. A method as defined in claim 11 wherein the formula is essentially of the form:

$$A(s, X_j, X_k)=C_1(X_j, X_k)+C_2(X_j, X_k)s^{-\frac{1}{2}}.$$

13. A method of displaying type characters organized into words comprising the steps of:

A) computing, for each of a plurality of pairs of successive words that form inter-word spaces bounded by character sequences $(X_j, X_k)$ of font size s, where $X_j$ and $X_k$ are respectively the first and second characters in a sequence, an adjustment value $A'(s, X_j, X_k)$ in accordance with a formula that, in relative units, is essentially as follows:

$$A'(s, X_j, X_k) = \sum_{n=1}^{K} C'_n(X_j, X_k) s^{r_n},$$

where the $C_n$'s are non-zero constants with respect to s, $r_n \neq 0$ for at least one value n, the values of $r_n$ differ for different values of n, K is an integer greater than 1, and the variation in $A'(s, X_j, X_k)$ with s is not the same for all $(X_j, X_k)$; and B) displaying the word pairs such that the words are spaced apart by distances adjusted in accordance with the spacing adjustments thus computed.

14. A method as defined in claim 13 wherein the adjustment $A'(s, X_j, X_k)$ as a function of s differs perceptibly from a linear function of s for at least some values of $(X_j, X_k)$.

15. A method as defined in claim 14 wherein $r_n < 0$ for at least one value of n.

16. A method as defined in claim 15 wherein the formula is essentially of the form:

$$A'(s, X_j, X_k) = C_1'(X_j, X_k) + C_2'(X_j, X_k) s^{-1/2}.$$

* * * * *